United States Patent
Stewart et al.

(10) Patent No.: US 11,143,629 B2
(45) Date of Patent: Oct. 12, 2021

(54) LASER BOND INSPECTION CALIBRATION SYSTEM

(71) Applicant: The Boeing Company, Chicago, IL (US)

(72) Inventors: Alan F. Stewart, Seattle, WA (US); Marc Joel Piehl, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 295 days.

(21) Appl. No.: 16/245,632

(22) Filed: Jan. 11, 2019

(65) Prior Publication Data

US 2020/0225195 A1 Jul. 16, 2020

(51) Int. Cl.
*G01N 29/30* (2006.01)
*G01N 29/04* (2006.01)
*G01N 29/24* (2006.01)

(52) U.S. Cl.
CPC .......... *G01N 29/30* (2013.01); *G01N 29/041* (2013.01); *G01N 29/2412* (2013.01); *G01N 29/2418* (2013.01); *G01N 2291/267* (2013.01)

(58) Field of Classification Search
CPC .. G01N 29/30; G01N 29/041; G01N 29/2412; G01N 29/2418; G01N 2291/267; G10K 15/046
USPC .......................................................... 73/643
See application file for complete search history.

(56) References Cited

U.S. PATENT DOCUMENTS

| | | | |
|---|---|---|---|
| 6,848,321 B2* | 2/2005 | Bossi | G01N 3/00 73/788 |
| 7,770,454 B2* | 8/2010 | Sokol | G01N 29/2412 73/588 |
| 8,156,811 B2* | 4/2012 | Toller | G01N 29/4454 73/588 |
| 9,857,288 B2 | 1/2018 | Sokol et al. | |
| 2006/0219014 A1* | 10/2006 | Turner | G01N 29/30 73/643 |
| 2010/0249570 A1* | 9/2010 | Carson | A61B 5/0095 600/407 |
| 2015/0128709 A1 | 5/2015 | Stewart et al. | |
| 2015/0128717 A1* | 5/2015 | May | B64F 5/60 73/800 |

(Continued)

OTHER PUBLICATIONS

The Extended European Search Report for EP 19196534.2 dated Mar. 13, 2020, pp. 1-7.

*Primary Examiner* — Lisa M Caputo
*Assistant Examiner* — Rose M Miller
(74) *Attorney, Agent, or Firm* — Coats & Bennett, PLLC

(57) ABSTRACT

Apparatuses, systems, and methods are presented for calibrating an inspection system, particularly a Laser Bond Inspection (LBI) system that identifies a strength of a test structure. The disclosed calibration system comprises a calibration panel, a surface motion sensor, and a processing circuit. The surface motion sensor senses a compression wave generated in the calibration panel responsive to a laser pulse applied by a LBI head to the calibration panel. The processing circuit outputs a calibration result for the laser inspection system responsive to one or more characteristics of the sensed compression wave. The calibration system provides significantly faster calibration results, and thus may be implemented more frequently to improve the accuracy and repeatability of the inspection system.

20 Claims, 9 Drawing Sheets

(56) References Cited

U.S. PATENT DOCUMENTS

2016/0131557 A1   5/2016  Bossi et al.
2019/0331646 A1*  10/2019  George .............. B23K 26/0853
2020/0049665 A1*  2/2020  Safai .................... H01S 3/0014

* cited by examiner

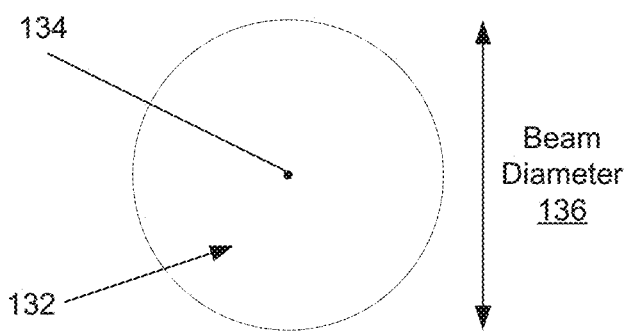
*FIGURE 8A*
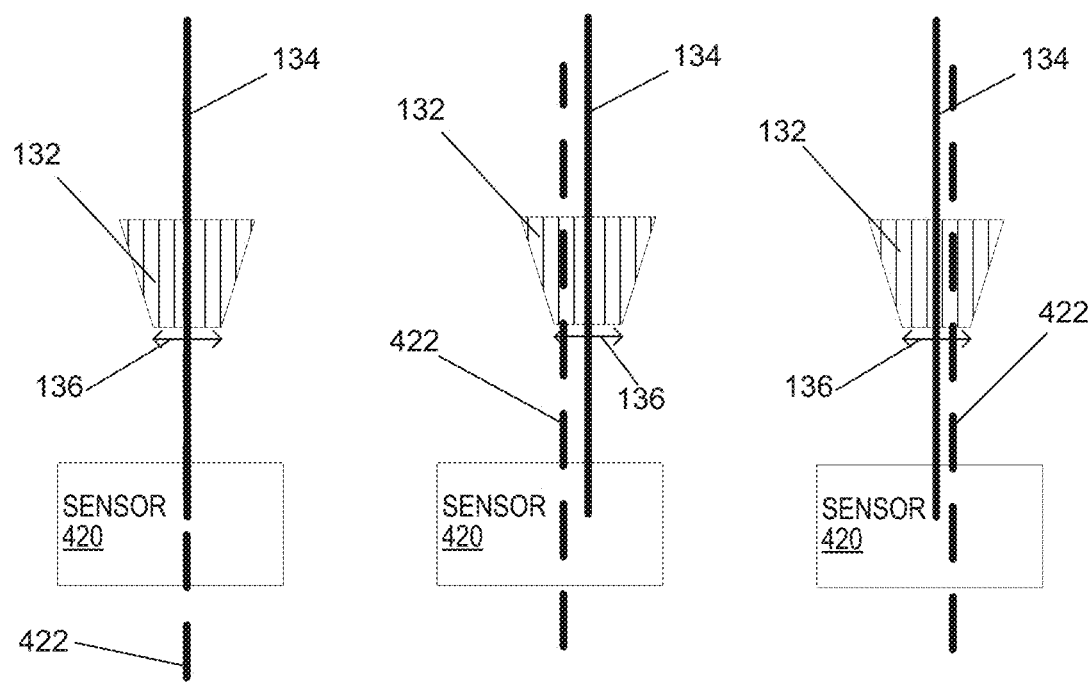
*FIGURE 8B*
*FIGURE 8C*
*FIGURE 8D*

LASER BOND INSPECTION CALIBRATION SYSTEM

This disclosure was made with Government Support under FA8650-17-C-5529 awarded by the Department of Defense. The government has certain rights to aspects of the solution presented herein.

TECHNOLOGICAL FIELD

The present disclosure relates generally to test structure inspection, and more particularly to the calibration of inspection systems used to evaluate the strength of a test structure.

BACKGROUND

Laser inspection systems, e.g., Laser Bond Inspection (LBI) systems, evaluate the strength of a test structure. For example, an LBI system may evaluate whether a structure, such as a unitized panel used to construct an airplane, has process flaws and/or is sufficiently strong for its intended use. In another example, an LBI system may evaluate whether a bond securing two structures together is sufficiently strong to maintain the bond during specified operating conditions. To ensure the accuracy of such strength evaluations, such inspection systems are calibrated.

Conventional calibration techniques for LBI systems involve third party calibration of one or more energy meters used by the LBI system, examination and measurement of a spot size generated by the LBI system on an ablative layer, e.g., an ablative tape, and testing of standardized test panels. Generally, each test panel goes through 60-100 tests, where each test further includes ultrasound inspection and data analysis. As a result, one calibration process typically takes 2-3 days to complete. If the result of the calibration indicates the LBI system is out of calibration, the calibration process may be repeated (after the LBI system is adjusted) one or more times until the LBI system is calibrated. Such extensive calibration techniques are costly, both in time and money. Further, because the conventional calibration techniques take so much time to implement, it is currently not possible to verify calibration of an LBI system each time it is used, or even on a daily and/or weekly basis. Thus, there remains a need for improved calibration solutions.

SUMMARY

According to aspects of the present disclosure, apparatuses, systems, and methods are presented for calibrating an inspection system, particularly a Laser Bond Inspection (LBI) system. The presented calibration system and solution provides significantly faster calibration results, and thus may be implemented more frequently to improve the accuracy and repeatability of the inspection system.

The present disclosure discloses a method of determining a calibration result for a laser inspection system comprising a laser bond inspection head configured to apply a laser pulse to a surface of a test structure to identify a strength of the test structure. The method comprises generating a compression wave in a calibration panel responsive to a laser pulse with a beam diameter applied by the laser bond inspection head to an ablative layer secured to a first surface of the calibration panel. The calibration panel comprises the first surface spaced from a second surface by a predetermined thickness, where the first surface is generally parallel to the second surface. The method further comprises sensing the compression wave using surface motion sensor fixedly spaced from the second surface of the calibration panel by a predetermined distance, where a longitudinal axis of the surface motion sensor generally aligns with a longitudinal axis of the laser bond inspection head within a tolerance window defined by the beam diameter. The method further comprises outputting a calibration result for the laser inspection system responsive to one or more characteristics of the sensed compression wave.

According to a further aspect, the surface motion sensor comprises an Electro-Magnetic Acoustic Transducer (EMAT).

According to a further aspect, the outputting of the calibration result of the laser inspection system comprises detecting at least one amplitude of the sensed compression wave, and outputting the determined calibration result responsive to the at least one detected amplitude.

According to a further aspect, the surface motion sensor comprises a Velocity Interferometer System for Any Reflector (VISAR) having a fixed tilt relative to the calibration panel.

According to a further aspect, the outputting of the calibration result of the laser inspection system comprises determining an amplitude of the compression wave responsive to the one or more characteristics of the sensed compression wave, and outputting the calibration result responsive to the determined amplitude.

According to a further aspect, the outputting of the calibration result comprises outputting the calibration result less than one minute after the laser bond inspection head applies the laser pulse to the ablative layer secured to the calibration panel.

According to a further aspect, if the calibration result indicates the laser inspection system is out of calibration, the method comprises repeating the calibration by generating, after one or more adjustments are made to the laser inspection system, a second compression wave in the calibration panel responsive to a second laser pulse with the beam diameter applied by the laser bond inspection head to the a new ablative layer secured to the first surface of the calibration panel, sensing the second compression wave using the surface motion sensor, and outputting the second calibration result for the laser inspection system responsive to one or more characteristics of the sensed second compression wave.

According to a further aspect, the calibration result comprises a first calibration result, where the outputting of the second calibration result comprises outputting the second calibration result less than one minute after generating the second compression wave.

According to a further aspect, the calibration result comprises a first calibration result, where the method further comprises repeating the calibration. For example, the method repeats the calibration by generating a second compression wave in the calibration panel responsive to a second laser pulse with the beam diameter applied by the laser bond inspection head to a new ablative layer secured to the first surface of the calibration panel, sensing the second compression wave using the surface motion sensor, and outputting the second calibration result for the laser inspection system responsive to one or more characteristics of the sensed second compression wave.

According to a further aspect, the first calibration result is obtained at a first time before the laser inspection system evaluates one or more test structures, and the second calibration result is obtained at a second time after the laser inspection system evaluates the one or more test structures.

According to a further aspect, the first calibration result is obtained at a first time before the laser inspection system evaluates a first set of one or more test structures, and the second calibration result is obtained at a second time before the laser inspection system evaluates a second set of one or more test structures, said second time occurring after said first time.

The present disclosure discloses a calibration system for determining a calibration of a laser inspection system comprising a laser bond inspection head configured to apply a laser pulse to a test structure to identify a strength of the test structure. The calibration system comprises a calibration panel, a surface motion sensor, and a processing circuit. The calibration panel comprises a first surface generally parallel to a second surface and spaced from the second surface by predetermined thickness. The surface motion sensor is fixedly spaced from the second surface of the calibration panel by a predetermined distance. Further, the surface motion sensor is configured to sense a compression wave generated in the calibration panel responsive to a laser pulse with a beam diameter applied by the laser bond inspection head to an ablative layer secured to the first surface of the calibration panel while a longitudinal axis of the surface motion sensor generally aligns with a longitudinal axis of the laser bond inspection head within a tolerance window defined by the beam diameter. The processing circuit is configured to output a calibration result for the laser inspection system responsive to one or more characteristics of the sensed compression wave.

According to a further aspect, the surface motion sensor comprises an Electro-Magnetic Acoustic Transducer (EMAT).

According to a further aspect, the surface motion sensor comprises a Velocity Interferometer System for Any Reflector (VISAR) having a fixed tilt relative to the calibration panel.

According to a further aspect, the surface motion sensor comprises a first surface motion sensor fixedly spaced from the second surface of the calibration panel by a first predetermined distance, and a second surface motion sensor proximate the first surface motion sensor and fixedly spaced from the second surface of the calibration panel by a second predetermined distance.

According to a further aspect, the first surface motion sensor comprises a Velocity Interferometer System for Any Reflector (VISAR) and the second surface motion sensor comprises an Electro-Magnetic Acoustic Transducer (EMAT).

According to a further aspect, the calibration panel comprises an aluminum panel, and wherein the predetermined thickness is less than 10 mm.

According to a further aspect, the calibration system is configured to output the calibration result less than one minute after the laser bond inspection head applies the laser pulse to the ablative layer secured to the calibration panel.

According to a further aspect, the calibration panel and the surface motion sensor are co-located in a portable calibration structure, and the processing circuit is spaced from, but operatively connected to, the portable calibration structure.

According to a further aspect, the calibration panel, the surface motion sensor, and the processing circuit are co-located in a portable calibration structure.

The features, functions and advantages that have been discussed can be achieved independently in various aspects or may be combined in yet other aspects further details of which can be seen with reference to the following description and the drawings.

BRIEF DESCRIPTION OF THE DRAWINGS

Figure 1:
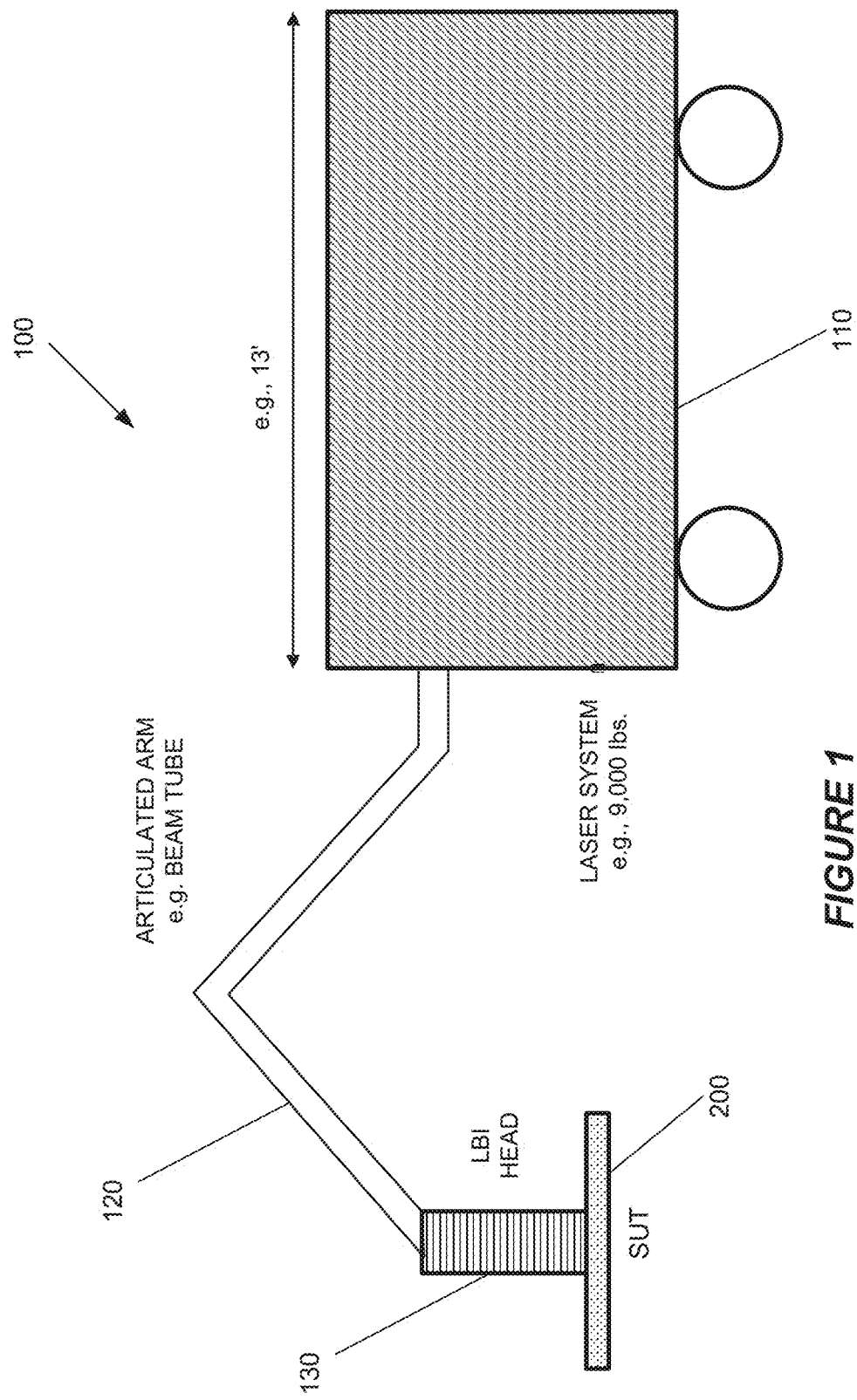

Having thus described variations of the disclosure in general terms, reference will now be made to the accompanying drawings, which are not necessarily drawn to scale, and wherein:

FIG. 1 shows a block diagram of an exemplary laser inspection system.

Figure 2:
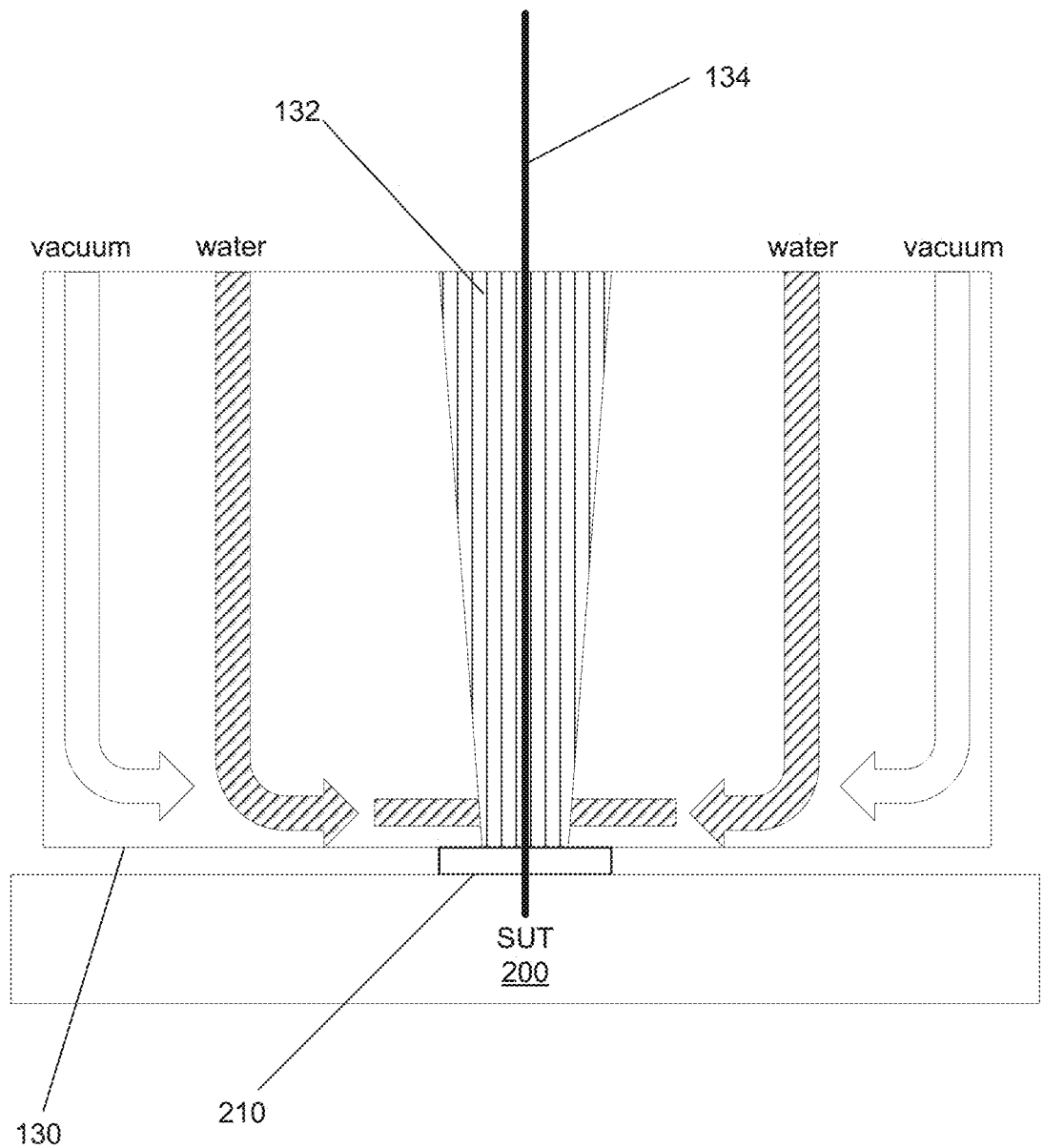

FIG. 2 shows additional details for the exemplary laser inspection system shown in FIG. 1.

FIGS. 3A-3C show an exemplary inspection of a structure under test as implemented by the laser inspection system of FIG. 1.

Figure 4:
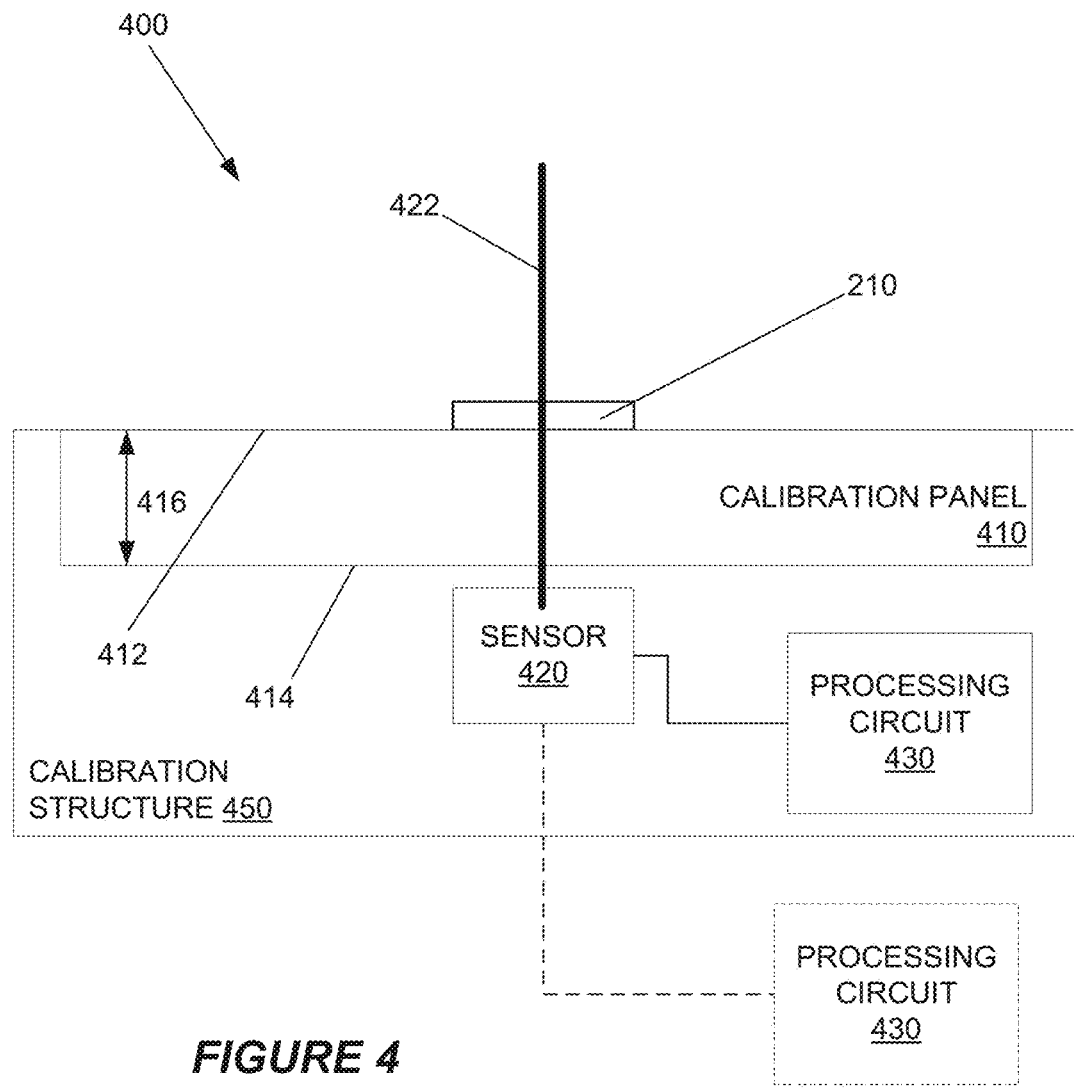

FIG. 4 shows a block diagram of an exemplary calibration system according to aspects disclosed herein.

Figure 5:
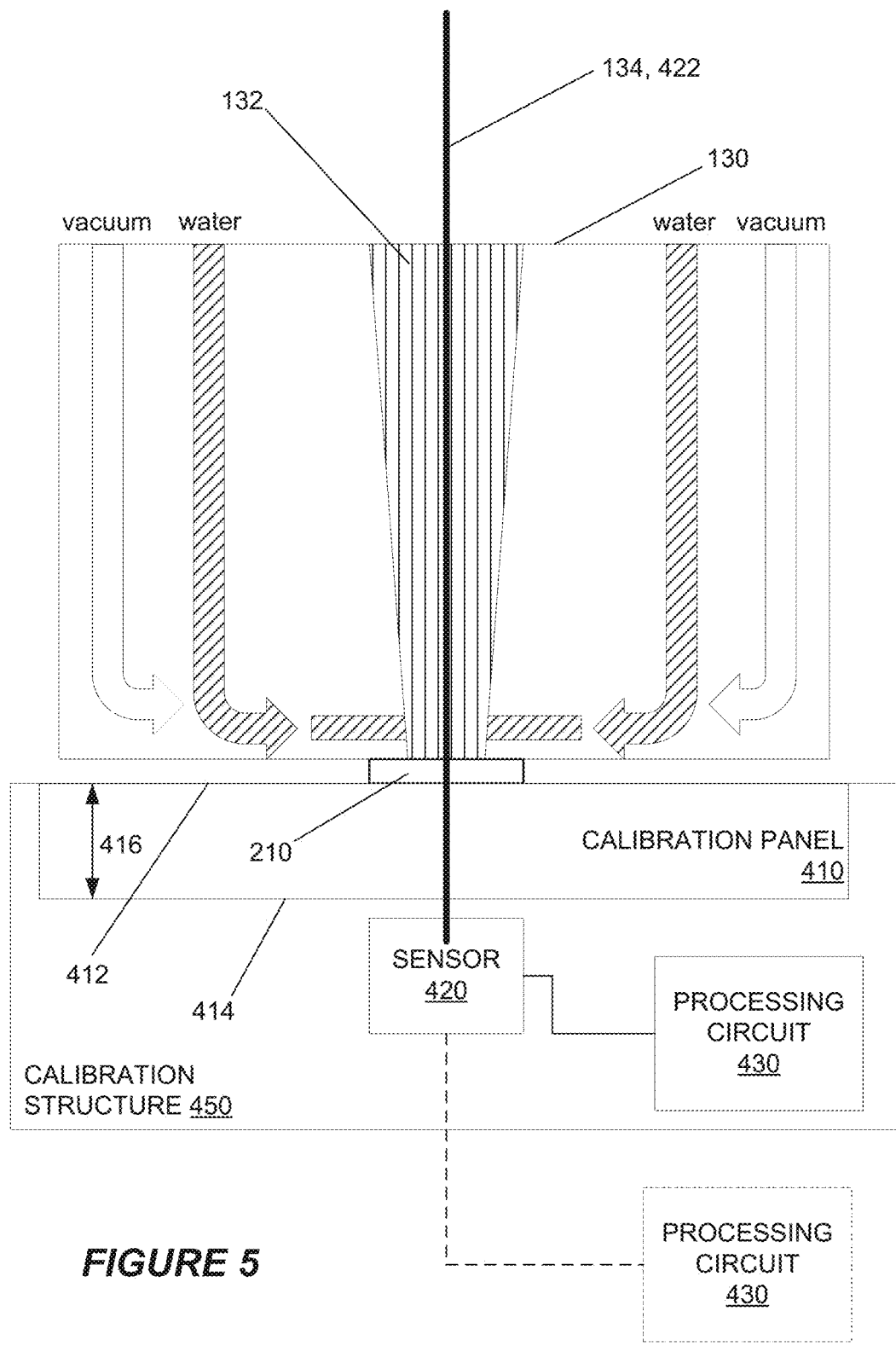

FIG. 5 shows the exemplary calibration system of FIG. 4 as implemented with the laser inspection system of FIG. 1.

Figure 6:
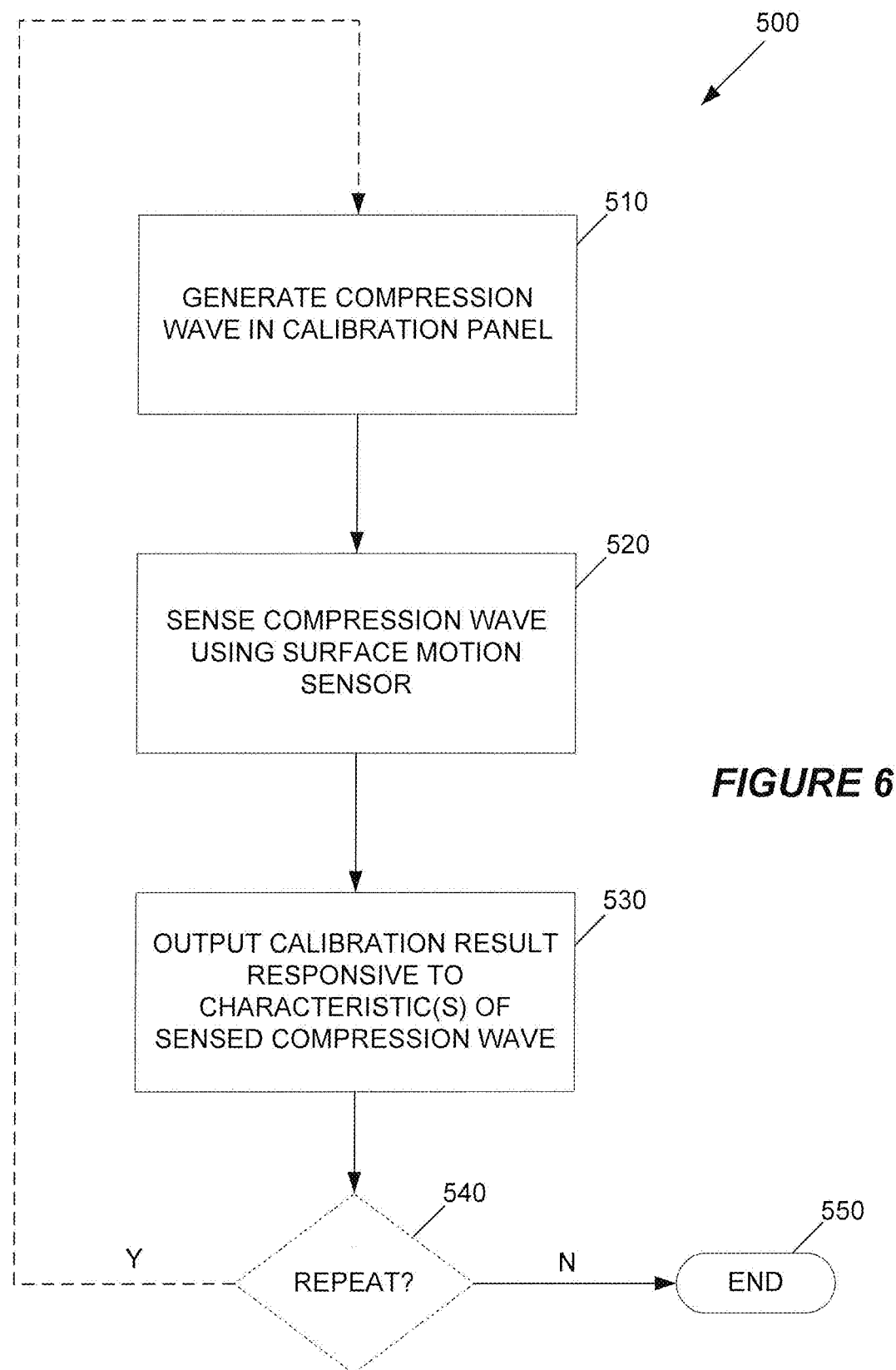

FIG. 6 shows an exemplary calibration method according to aspects disclosed herein.

Figure 7:
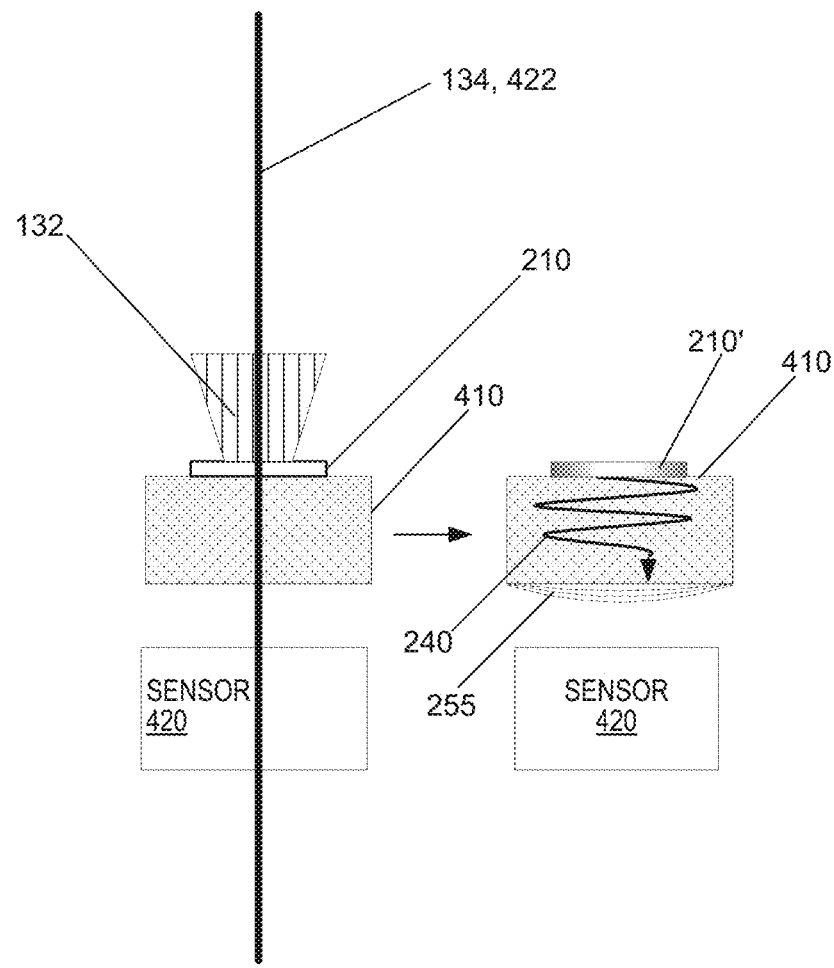

FIG. 7 shows an exemplary calibration of a laser inspection system according to aspects disclosed herein.

FIGS. 8A-8D show alignment examples for the calibration system of FIG. 4.

Figure 9:
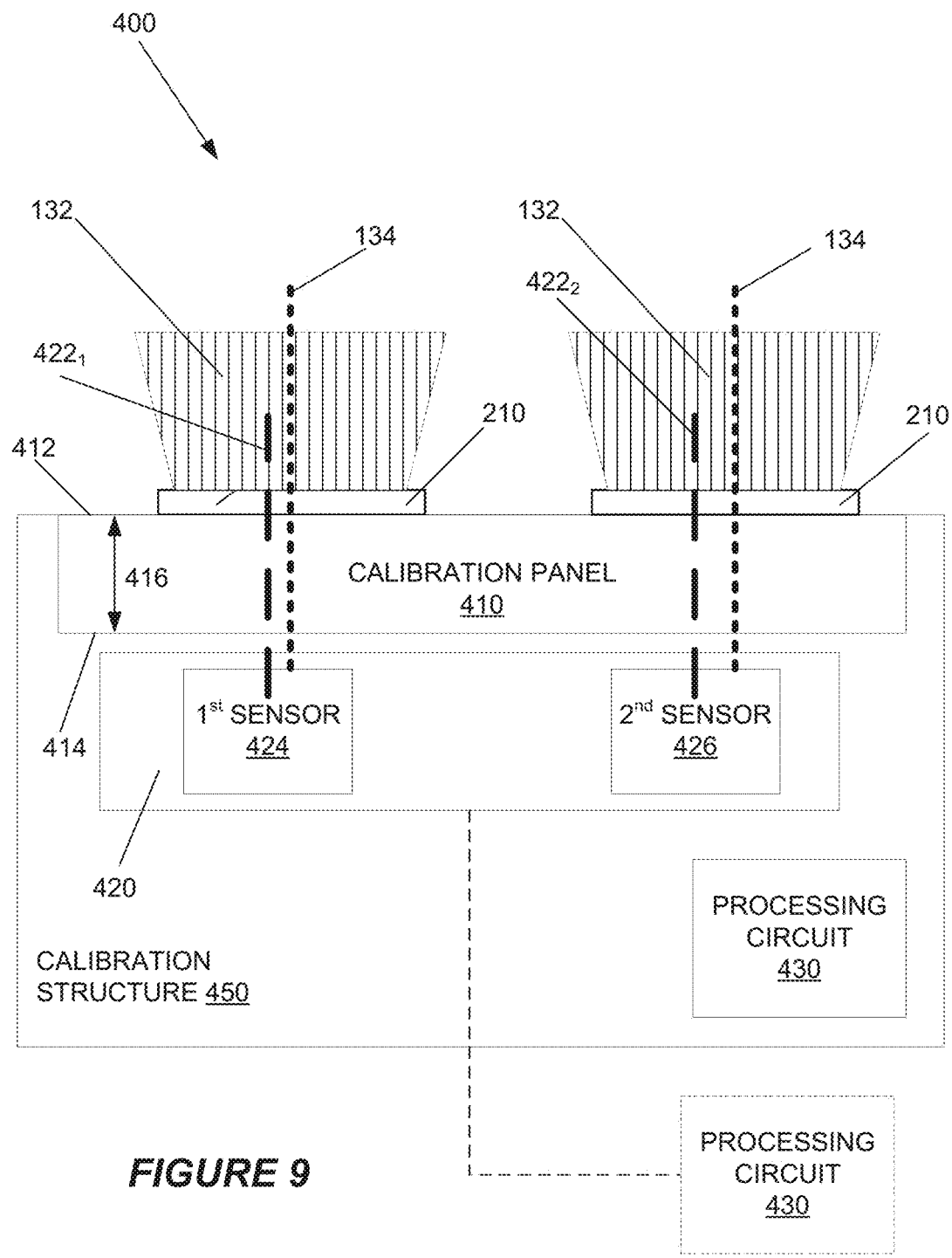

FIG. 9 shows a block diagram of another exemplary calibration system according to aspects disclosed herein.

DETAILED DESCRIPTION

FIG. 1 shows an exemplary Laser Bond Inspection (LBI) system 100 configured to inspect a test structure, also referred to herein as a Structure Under Test (SUT), 200. LBI system 100 comprises laser system 110, tube 120, and LBI head 130. Laser system 110 generates a laser beam, an overlay (e.g., water flow), and a vacuum responsive to input controls. For example, the water flow provides a tamping layer over an ablative layer, which acts to enhance the amplitude of the compression wave in the SUT 200, while a vacuum may be used to remove the majority of the water used during the process. Tube 120 comprises one or more pipes or channels for carrying the laser beam, overlay, and vacuum from the laser system 110 to the LBI head 130. LBI head 130 shapes the generated laser beam for application as a laser pulse 132 to the SUT 200, e.g., as shown in FIG. 2. More particularly, the LBI head 130 applies the laser pulse 132 to an ablative layer 210, e.g., an ablative tape (e.g., 3M 471 tape), black paint, etc., secured or otherwise applied to a surface of the SUT 200 to generate a compression wave in the SUT 200. An exemplary LBI head 130 generates a laser pulse 132 having a pulse duration of 100-300 ns, a pulse energy of 1-40 J, and a wavelength of 1054 nm. As shown in FIG. 2, a longitudinal axis 134 of the laser pulse 132 generally aligns with a center of the ablative layer 210. It will be appreciated, however, that such is not required. Other implementations may instead ensure that the laser pulse 132 hits some portion of the ablative layer 210 such that the laser pulse 132 does not fall outside the ablative layer 210. In any event, characteristics of the SUT 200, e.g., strength, flaws, etc., are determined based on how the SUT 200 responds to the compression wave.

FIGS. 3A-3B demonstrate the LBI process as applied to a SUT 200 comprising a first layer 220 bonded to a second layer 230. As shown in FIG. 3A, a non-destructive element 300, e.g., an ultrasound device, performs a Non-Destructive Evaluation (NDE) pre-test of the SUT 200. For example, NDE 300 applies an ultra-sound wave to the SUT 200. The generated ultrasound wave passes through the SUT 200 and bounces off any boundaries, e.g., the boundary between the first layer 220 and the second layer 230. The NDE device 300 captures any reflected waves to generate an image of the SUT 200, including an image of the boundary. This NDE pre-test provides a baseline for the SUT 200 that serves as a basis for comparison once the structure test is complete.

Figure 3:
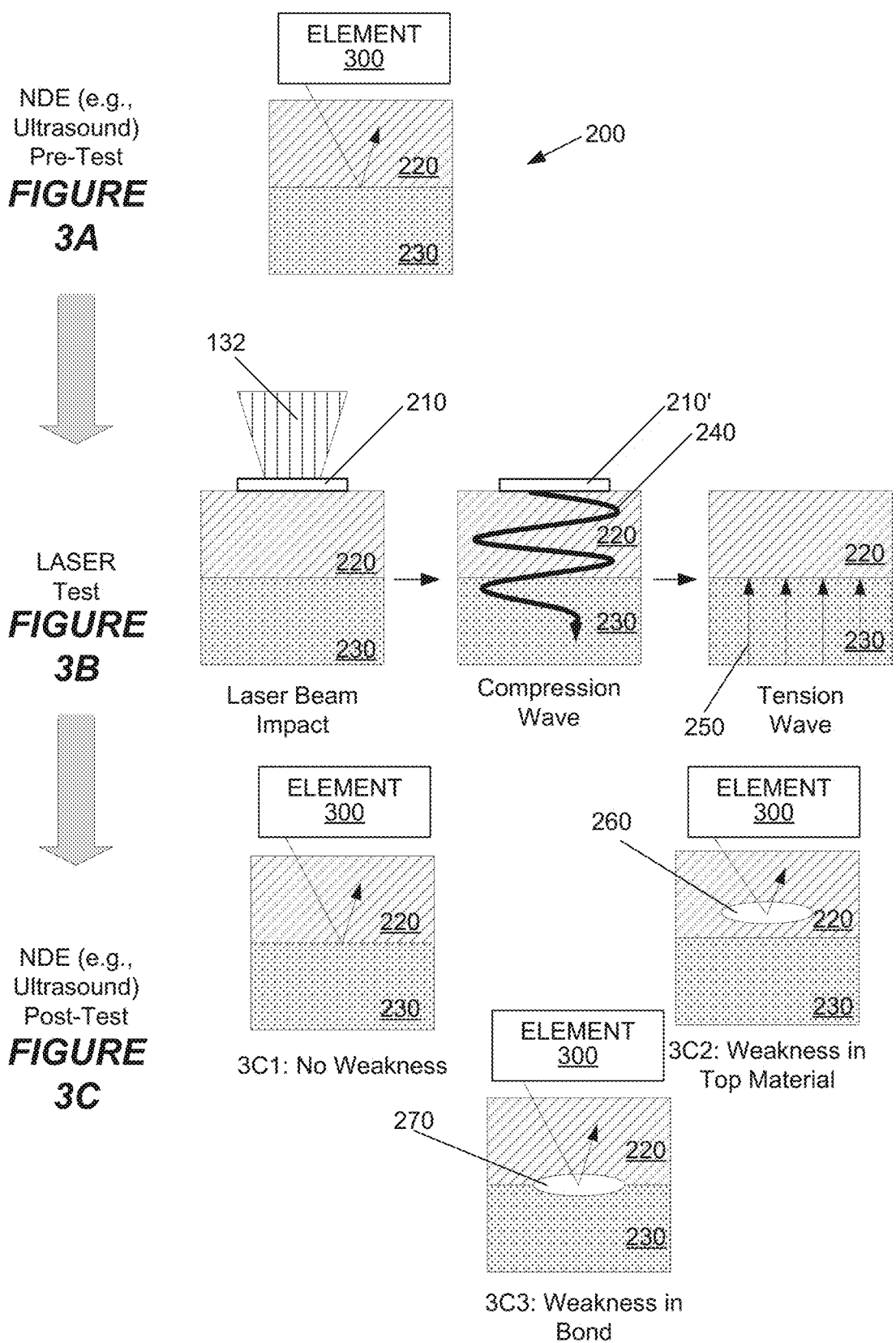

In FIG. 3B, the LBI head 130 applies the generated laser pulse 132 to the ablative layer 210 to generate a compression wave 240 in the SUT 200. As shown in FIG. 3B, the laser pulse 132 generally damages the ablative layer such that only a portion 210' of the ablative layer 210 remains. The compression wave 240 passes through the first layer 220, through the boundary of the first and second layers, and through the second layer 230, ultimately causing a tension wave 250 to reflect off the far boundary of the second layer 230. While not shown, a portion of the compression wave amplitude may reflect off the boundary between the first layer 220 and the second layer 230, which reduces the amplitude of the compression wave in the second layer 230. Additional amplitude losses may occur due to scattering from interlaminar interfaces between plies, or defects (e.g., porosity in the first and/or second layers and/or in the adhesive layer used to bond the first and second layers). The amplitude of any losses (e.g., due to reflections, scattering, defects, etc.) depends on the properties of the materials used to fabricate the first and second layers, as well as acoustic properties of the adhesive bonding the first and second layers together. When the LBI system 100 is functioning properly, the tension wave 250 resulting from the compression wave 240 is strong enough to expose weaknesses in the SUT 200, while leaving any sufficiently strong portions of the SUT 200 unaffected by the test. Subsequently, the NDE device 300 performs a NDE post-test (FIG. 3C) to see if there is any change in the material relative to the NDE pre-test. For example, if the first and second layers 220, 230 as well as the bond between the first layer 220 and the second layer 230, are sufficiently strong (e.g., meet strength specifications) in the area of the test, then there are no flaws in the SUT 200, and the NDE post-test will match the NDE pre-test, e.g., as shown in FIG. 3C1. If one of the layers 220, 230 has a weakness, the tension wave 250 creates a flaw at the site of that weakness, which is detected by the NDE post-test, e.g., as shown in FIG. 3C2. Similarly, if the bond between the first and second layers 220, 230 has a weakness, the tension wave 250 creates a flaw 260 in the area of the weakness, which is detected by the NDE post-test, e.g., as shown in FIG. 3C3. While FIGS. 3C2 and 3C3 each only show a single weakness flaw 260 in specific areas of the SUT 200, it will be appreciated that the LBI test may expose multiple flaws in one or both layers 220, 230 and/or the bond area between the layers 220, 230.

As noted above, the LBI system 100 is designed to generate compression/tension waves with sufficient amplitude to create flaws in the SUT 200 wherever the SUT 200 has a weakness, but not with an amplitude that damages sufficiently strong (e.g., passes strength requirements) materials and/or bonds. The amplitude of the compression/tension wave is impacted by how much laser energy (e.g., due to power and size of the laser pulse 132) is incident on the ablative layer 210, the condition of the ablative layer 210, the type of overlay (e.g., water or otherwise), and/or the thickness of the overlay. In order to achieve that goal, the LBI system is calibrated to generate a pulse wave with the desired beam size and power that will achieve the desired compression wave (both in size and power). Conventional calibration solutions, while accurate, are time consuming, i.e., taking a minimum of 2-3 days to complete the calibration, and costly. Aspects of the solution presented herein provide significant improvements over the conventional techniques by providing a calibration system and method capable of providing a calibration result in minutes, and in some cases, in a few seconds. Further, aspects of the calibration system presented herein may be implemented in a portable package, which may eliminate the need for third party calibrations.

FIG. 4 shows an exemplary block diagram of a calibration system 400 according to aspects of the solution presented herein. Calibration system 400 comprises a calibration panel 410, a sensor 420, and a processing circuit 430. The calibration panel 410 and sensor 420 are disposed in a calibration structure 450 to provide the desired alignment/spacing between the sensor 420 and the calibration panel 410. For simplicity and clarity, FIG. 4 does not show the mounting hardware that mechanically secures the calibration panel 410, sensor 420, and calibration structure 450, but those skilled in the art will appreciate that the calibration system 400 includes such mounting hardware. As shown in FIG. 4, the processing circuit 430 may be included in the same calibration structure 450 as the calibration panel 410 and sensor 420, or may be located remotely from the calibration structure 450. In either case, the processing circuit 430 connects to the sensor 420 via any suitable wires and/or connectors (not shown).

The calibration panel 410 has a thickness 416 defined by generally parallel opposing surfaces 412, 414. Exemplary calibration panels 410 include, but are not limited to, a laminate panel, an aluminum panel (e.g., aluminum 6061), etc. In one exemplary aspect, the calibration panel 410 is made from aluminum that is 2-8 mm thick. In one exemplary aspect, the calibration panel 410 is rectangular with dimensions, e.g., 5"×8", larger than the LBI head 130. According to some aspects, the calibration panel 410 may comprise any known material and size having a known response to the desired laser pulse 132, e.g., the pulse intended for testing the SUT 200.

One surface of the calibration panel 410, e.g., the first surface 412, is configured relative to the calibration structure 450 such that at least a portion of the first surface 412 is accessible, e.g., exposed to open air. In one example, the size of the accessible area of the calibration panel 410 is at least the size of the desired ablative layer 210, and thus is at least slightly larger than the laser pulse 132 generated by the LBI head 130. It will be appreciated that a larger area of the first surface 412, including the entire first surface 412, may be exposed to open air. In exemplary aspects, the LBI head 130 is confined to the location of the ablative layer 210 and is coaxial with the sensor 420, where the LBI head 130 interfaces with the first surface 412 (or at least a portion of the first surface 412). While FIG. 4 shows the first surface 412 as being aligned with one of the external boundaries of calibration structure 450, it will be appreciated that such is not required. Other implementations may have the calibration panel 410 mounted by the calibration structure 450 such that the first surface 412 extends outside/above an outer edge of the calibration structure 450, while still other implementations may have the calibration panel 410 mounted by the calibration structure 450 such that the first surface 412 is within/below an outer edge of the calibration structure 450. While not shown, the calibration panel may include alignment marks or structures (e.g., physical guides) useful for aligning the LBI head with the calibration panel 410 and sensor 420.

The sensor 420 is fixedly spaced from the second surface 414 of the calibration panel 410. Sensor 420 may comprise any sensor capable of detecting surface motion of the second surface 414. In some aspects, sensor 420 is disposed in a housing fixedly mounted to the second surface 414. Whether mounted directly to the calibration panel 410 or mounted independently from the calibration panel 410, sensor 420 has a fixed spacing relative to the second surface 414 of the calibration panel 410 and a fixed alignment relative to the calibration panel 410, where the specific requirements of this spacing and alignment depend on the type of sensor used for sensor 420. For aspects disclosed herein, the sensor 420 preferably has sufficient bandwidth to detect all desired characteristics of the compression wave, e.g., 1-200 MHz. Exemplary sensors may comprise non-contact sensors, which include but are not limited to, an Electro-Magnetic Acoustic Transducer (EMAT), a Velocity Interferometer System for any Reflector (VISAR), etc. In the case of an EMAT, the distance from the second surface 414 is carefully controlled (e.g., 0.01"), while in the case of a VISAR, both the distance (e.g., 0.25"-1") and the tilt relative to the second surface 414 is carefully controlled. Exemplary sensors 420 may also comprise contact sensors, e.g., a PolyVinyliDene Fluoride (PVDF) sensor, which directly contacts the second surface 414, an optical fiber, which may be embedded in the calibration panel 410, etc. Because some sensors (e.g., some contacted or embedded sensors) are sensitive to, and may be disbanded and/or damaged by, high compression wave amplitudes, it will be appreciated that the type of sensor used may directly impact the amplitude of the test compression wave that may be used for calibration.

The processing circuit 430 processes the output of the sensor 420 to determine a calibration result responsive to one or more characteristics of the motion detected by the sensor 420. In one exemplary aspect, the processing circuit 430 processes the output of the sensor to determine the peak amplitude of the motion detected by the sensor 420. Other exemplary characteristics determined by the processing circuit 430 include, but are not limited to, frequency, amplitudes of one or more frequency components, and/or temporal characteristics, e.g., duration of the peak amplitude, duration of the compression wave, etc. From these one or more characteristics, the processing circuit 430 may determine a calibration result.

The processing circuit 430 may further be configured to output the calibration result. In some aspects, the processing circuit 430 may simply output a pass/fail (e.g., green/red) indication. In other aspects, the processing circuit 430 may output additional calibration information, including but not limited to a relative calibration indication, e.g., 10% out of calibration. For example, the processing circuit 430 may output an amplitude and a temporal width (e.g., pulse width) of a peak of the motion detected by the sensor 420. The processing circuit 430 may also or alternatively compare the amplitude and pulse width to a calibration amplitude and pulse width to determine whether the detected amplitude and pulse width is within an acceptable calibration range, e.g., 10%, of the calibration amplitude and pulse width. If within the calibration range, the processing circuit 430 may output the actual percentage in addition to the pass/fail indication.

FIGS. 5-7 show exemplary aspects of a calibration process as implemented by the calibration system 400. In particular, FIG. 5 shows an exemplary calibration system 400 relative to the LBI head 130, FIG. 6 shows an exemplary calibration method 500, and FIG. 7 shows an exemplary calibration process from the perspective of the system alignment and the involved components. LBI head 130 applies the laser pulse 132 to the ablative layer 210, which generates a compression wave 240 in the calibration panel 410 (block 510). The impact of the laser pulse 132 damages the ablative layer 210, resulting in a marked ablative layer 210', which may show the footprint of the beam. The sensor 420 senses the movement 255 of the second surface caused by the compression wave 240, where a longitudinal axis 422 of the sensor 420 generally aligns with a longitudinal axis 134 of the LBI head 130 within a tolerance window defined by the beam diameter (block 520). The processing circuit 430 outputs a calibration result for the LBI system 100 responsive to one or more characteristics of the sensed compression wave (block 530). Once the calibration is complete, the calibration method ends (block 550).

Because the calibration process disclosed herein relies on detection and evaluation of the compression wave generated by the impact of the laser pulse 132, as opposed to analyzing the spot generated by the beam, the calibration results may be acquired significantly faster, e.g., within seconds of the application of the laser pulse 132, than with conventional techniques. Even when the time required to align the calibration system 400 with the LBI head 130 is taken into consideration, the complete calibration process may be achieved in minutes. For example, experimental implementations of the calibration system 400 set up in the lab, which involves significant manual movement and/or manipulation of the data, have provided calibration results in a few minutes. Integrated systems, which will automate most, if not all, of the manual aspects, are expected to provide a calibration result in 15 seconds or less after application of the laser pulse 132. For example, an integrated calibration system may execute the test, perform the comparison between the detected amplitude and pulse width and the calibration amplitude and pulse width, and output the associated result 15 seconds or less after the application of the laser pulse 132. As such, blocks 510-530 of the calibration method 500 may be repeated (block 540) whenever and as often as desired. For example, if the calibration results indicate the LBI system 100 is out of calibration, blocks 510-530 of the calibration method 500 may be repeated to confirm the calibration results and/or after adjustment of the LBI system 100 to determine if the adjustment brought the LBI system 100 into calibration. Alternatively or additionally, blocks 510-530 of the calibration method 500 may be repeated at any desired time and/or interval, e.g., at the beginning of a shift, at the end of a shift, after running some number of tests (e.g., after 500-1000 tests), after changing the type of SUT 200 being tested, etc.

The efficiency of the sensor 420 depends on the location of the sensor relative to the laser pulse 132 as well as relative to the calibration panel 410. Thus, not only is the angular orientation relative to the calibration panel 410 and/or the spacing from the second surface 414 important, but the alignment of the longitudinal axis 422 of the sensor 420 relative to the laser pulse 132 is also important. FIG. 8A shows an exemplary laser pulse 132 having a longitudinal axis 134 and a beam diameter 136, e.g., at least 8 mm. To improve the efficiency of the sensor 420, the longitudinal axis 422 of the sensor 420 should be within the beam diameter 136 of the laser pulse 132, and preferably within 2-3 mm of the longitudinal axis 134 of the LBI head 130. This could mean aligning the longitudinal axis 422 of the sensor 420 with the longitudinal axis of the LBI head 130, as shown in FIG. 8B. Alternatively, this could mean aligning the longitudinal axis 422 of the sensor 420 proximate the longitudinal axis 134 of the LBI head 130 but within the beam diameter 136, as shown in FIGS. 8C and 8D, e.g., within a 2-3 mm radios of the longitudinal axis 134. When sensor 420 comprises a VISAR, for example, it is preferable to align the longitudinal axis 422 of the VISAR as shown in FIG. 8B, or as close as possible. EMAT, however, has a larger sensing area, and thus the alignment requirements are more relaxed, e.g., as shown in FIG. 8C or FIG. 8D. While not required, it will be appreciated that in some exemplary aspects the calibration panel 410 may include alignment marks or structures, which help an operator align the LBI head 130 relative to the sensor 420 for the calibration process.

Aspects of the solution presented herein are described in terms of sensor 420 comprising a single sensor having a longitudinal axis 422 generally aligned with the LBI head 130 within the beam diameter 136. The solution is not limited to a single sensor, however. FIG. 9 shows exemplary aspects where sensor 420 comprises a first sensor 424 and a second sensor 426, where each sensor is associated with a corresponding LBI head 130. For example, the first sensor 424 may comprise a VISAR and the second sensor 426 may comprise an EMAT. The longitudinal axis $422_1$ of the first sensor 424 and the longitudinal axis $422_2$ of the second sensor 426 each generally align with the longitudinal axis 134 of a corresponding the LBI head 130 within the beam diameter 136, as shown in FIG. 9. It will be appreciated that while FIG. 9 shows the first sensor 424 and the second sensor 426 having the same spacing from the second surface 414 of the calibration panel 410, such equal spacing is not required. Other aspects may include more than two sensors. In so doing, aspects of the solution presented herein enable different types of data regarding the compression wave to be collected, e.g., due to the capabilities of the different sensors.

Aspects of the solution presented herein are described in terms of LBI and LBI heads 130 that apply a laser pulse 132. The solution presented herein, however, is not limited to LBI systems. The compression wave 240 used to test the strength of a SUT 200 may be generated using any means for generating a shockwave (which generates the compression wave in the SUT 200), and thus the calibration solution presented herein applies to any means for generating a compression wave 240 used for such strength tests. Exemplary non-LBI means for generating such shockwaves include, but are not limited to, a flyer "gun" that propels an object onto the first surface 412 of the calibration panel, an exploding bridge wire, etc.

Aspects of the present disclosure further include various methods and processes, as described herein, implemented using various hardware configurations configured in ways that vary in certain details from the broad descriptions given above. For instance, one or more of the processing functionalities discussed above may be implemented using a general-purpose microprocessor configured with program instructions rather than dedicated hardware, depending on, e.g., the design and cost tradeoffs for the various approaches, and/or system-level requirements outside the scope of the present disclosure.

Indeed, aspects of the present disclosure can, of course, be carried out in other ways than those specifically set forth herein without departing from the essential characteristics therefrom. The aspects disclosed herein are to be considered in all respects as illustrative and not restrictive, and all changes coming within the meaning and equivalency range of the appended claims are intended to be embraced therein. In particular, although steps of particular processes or methods described herein are shown and described as being in a particular sequence or temporal order, the steps of any such processes or methods are not limited to being carried out in any particular sequence or order, absent an indication otherwise. Indeed, the steps in such processes or methods are generally carried out in various different sequences and orders according to particular aspects of the present disclosure while still falling within the scope of the present disclosure.

What is claimed is:

1. A method of determining a calibration result for a laser inspection system comprising a laser bond inspection head configured to apply a laser pulse to a surface of a test structure to identify a strength of the test structure, the method comprising:
generating a compression wave in a calibration panel responsive to a laser pulse with a beam diameter applied by the laser bond inspection head to an ablative layer secured to a first surface of the calibration panel, the calibration panel comprising the first surface spaced from a second surface by a predetermined thickness, wherein said first surface is generally parallel to said second surface;
sensing the compression wave using surface motion sensor fixedly spaced from the second surface of the calibration panel by a predetermined distance and positioned on an opposing side of the calibration panel from the laser bond inspection head, wherein a longitudinal axis of the surface motion sensor generally aligns with a longitudinal axis of the laser bond inspection head within a tolerance window defined by the beam diameter; and
outputting a calibration result for the laser inspection system responsive to one or more characteristics of the sensed compression wave.

2. The method of claim 1 wherein the surface motion sensor comprises an Electro-Magnetic Acoustic Transducer (EMAT).

3. The method of claim 2 wherein said outputting the calibration result of the laser inspection system comprises:
detecting at least one amplitude of the sensed compression wave; and
outputting the determined calibration result responsive to the at least one detected amplitude.

4. The method of claim 1 wherein the surface motion sensor comprises a Velocity Interferometer System for Any Reflector (VISAR) having a fixed tilt relative to the calibration panel.

5. The method of claim 4 wherein said outputting the calibration result of the laser inspection system comprises:
determining an amplitude of the compression wave responsive to the one or more characteristics of the sensed compression wave; and
outputting the calibration result responsive to the determined amplitude.

6. The method of claim 1 wherein said outputting the calibration result comprises outputting the calibration result less than one minute after the laser bond inspection head applies the laser pulse to the ablative layer secured to the calibration panel.

7. The method of claim 1 further comprising, if the calibration result indicates the laser inspection system is out of calibration, repeating the calibration by:
generating, after one or more adjustments are made to the laser inspection system, a second compression wave in the calibration panel responsive to a second laser pulse with the beam diameter applied by the laser bond inspection head to a new ablative layer secured to the first surface of the calibration panel;

sensing the second compression wave using the surface motion sensor; and outputting a second calibration result for the laser inspection system responsive to one or more characteristics of the sensed second compression wave.

8. The method of claim 7 wherein the calibration result comprises a first calibration result, and wherein said outputting the second calibration result comprises outputting the second calibration result less than one minute after generating the second compression wave.

9. The method of claim 1 wherein the calibration result comprises a first calibration result, the method further comprising repeating the calibration by:

generating a second compression wave in the calibration panel responsive to a second laser pulse with the beam diameter applied by the laser bond inspection head to a new ablative layer secured to the first surface of the calibration panel;

sensing the second compression wave using the surface motion sensor; and outputting a second calibration result for the laser inspection system responsive to one or more characteristics of the sensed second compression wave.

10. The method of claim 9 wherein the first calibration result is obtained at a first time before the laser inspection system evaluates one or more test structures, and the second calibration result is obtained at a second time after the laser inspection system evaluates the one or more test structures.

11. The method of claim 9 wherein the first calibration result is obtained at a first time before the laser inspection system evaluates a first set of one or more test structures, and the second calibration result is obtained at a second time before the laser inspection system evaluates a second set of one or more test structures, said second time occurring after said first time.

12. A calibration system for determining a calibration of a laser inspection system comprising a laser bond inspection head configured to apply a laser pulse to a test structure to identify a strength of the test structure, the calibration system comprising:

a calibration panel comprising a first surface generally parallel to a second surface and spaced from the second surface by predetermined thickness;

a surface motion sensor fixedly spaced from the second surface of the calibration panel by a predetermined distance and positioned on an opposing side of the second surface away from the first surface, the surface motion sensor configured to sense a compression wave generated in the calibration panel responsive to a laser pulse applied to an ablative layer secured to the first surface of the calibration panel while a longitudinal axis of the surface motion sensor generally aligns with a longitudinal axis of the laser bond inspection head within a tolerance window defined by a beam diameter of the laser pulse; and a processing circuit configured to output a calibration result for the laser inspection system responsive to one or more characteristics of the sensed compression wave.

13. The calibration system of claim 12 wherein the surface motion sensor comprises an Electro-Magnetic Acoustic Transducer (EMAT).

14. The calibration system of claim 12 wherein the surface motion sensor comprises a Velocity Interferometer System for Any Reflector (VISAR) having a fixed tilt relative to the calibration panel.

15. The calibration system of claim 12 wherein the surface motion sensor comprises:

a first surface motion sensor fixedly spaced from the second surface of the calibration panel by a first predetermined distance; and a second surface motion sensor proximate the first surface motion sensor and fixedly spaced from the second surface of the calibration panel by a second predetermined distance.

16. The calibration system of claim 15 wherein the first surface motion sensor comprises a Velocity Interferometer System for Any Reflector (VISAR) and the second surface motion sensor comprises an Electro-Magnetic Acoustic Transducer (EMAT).

17. The calibration system of claim 12 wherein the calibration panel comprises an aluminum panel, and wherein the predetermined thickness is less than 10 mm.

18. The calibration system of claim 12 wherein the calibration system is configured to output the calibration result less than one minute after the laser bond inspection head applies the laser pulse to the ablative layer secured to the calibration panel.

19. The calibration system of claim 12 wherein the calibration panel and the surface motion sensor are co-located in a portable calibration structure, and the processing circuit is spaced from, but operatively connected to, the portable calibration structure.

20. The calibration system of claim 12 wherein the calibration panel, the surface motion sensor, and the processing circuit are co-located in a portable calibration structure.

* * * * *